United States Patent Office 3,542,703
Patented Nov. 24, 1970

3,542,703
PREPARATION OF POLYIMIDE FOAMS
Ralph E. De Brunner, Kettering, Ohio, assignor to Monsanto Research Corporation, St. Louis, Mo., a corporation of Delaware
No Drawing. Original application Dec. 20, 1966, Ser. No. 603,179. Divided and this application Apr. 28, 1969, Ser. No. 833,239
Int. Cl. C08g 20/32, 53/08
U.S. Cl. 260—2.5                                    6 Claims

ABSTRACT OF THE DISCLOSURE

The method of preparing a foamed polyimide by heating a mixture of a bis(dialkylaminoalkyl) ester of an aromatic tetracarboxylic acid, an aromatic diamine, and an inert organic liquid solvent at a temperature of about 150–500° C.; said foamed polyimide being useful as an insulating material or heat shield.

---

This is a division of application Ser. No. 603,179, filed Dec. 20, 1966.

This invention relates to foamed compositions and more particularly provides a new and valuable method of producing foamed polyimides.

In prior art, foamed polyimide articles have been produced by incorporating a blowing agent into a solution of a polyimide-forming prepolymer and curing the resulting mixture. See, e.g., the W. R. Hendrix Pat. No. 3,249,561, wherein there is used as blowing agent a gas-producing acid such as oxalic, malonic, citric or formic acid. During the curing step, the acid decomposes to give bubbles of carbon dioxide and/or carbon monoxide in the solution. This causes foaming of the solution; and, as the solution foams, it is converted to the solid, porous polyimide when exposed to curing temperatures. Use of the gas-liberating acids for producing the foam is difficult to control, however; and, owing to the fact that foaming occurs while the polyimide-forming prepolymer is in solution, the method is not readily applicable to the preparation of laminates or other compression-molded composites.

The polyimides are usually prepared by reaction of an aromatic tetracarboxylic acid dianhydride with an organic diamine to obtain an intermediate, curable prepolymer wherein there are present amide linkages from an amino group of the diamine and a carboxy group of the tetracarboxylic component, with two carboxy groups of the tetracarboxylic component being unlinked to the organic amine component. Upon heating at elevated temperatures, intramolecular cyclization occurs with reaction of the unreacted carboxylic group at the amide portion of the polymer to give an imide structure. Thus, condensation of, say, 1,2,4,5-benzenetetracarboxylic dianhydride and p-phenylenediamine to give a prepolymer amide-acid and curing of the latter to a polyimide proceeds substantially as follows;

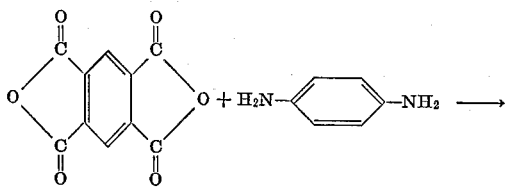

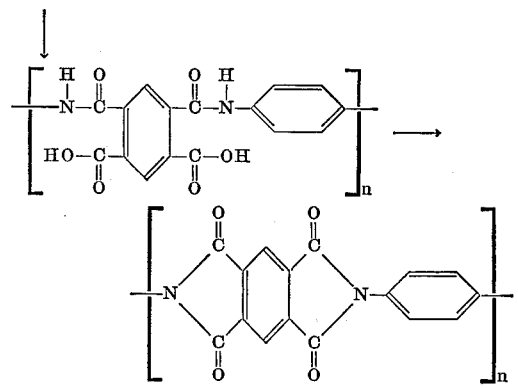

where $n$ denotes the degree of polymerization.

The above-depicted polyamide/acids possess limited solubility; hence, in order to employ them in solution, it has been necessary to use such uncommon, expensive solvents as N-methylpyrrolidone, dimethylformamide, dimethylacetamide, dimethyl sulfoxide, etc. Some of such solvents present toxicity hazards. Also, a significant technical disadvantage stems from the fact that use of such solvents is hard on the manufacturing equipment, e.g., dipping tanks. Clean-up becomes a cumbersome, expensive operation whenever water and/or readily available solvents are ineffective for this purpose.

Accordingly, an object of this invention is the provision of improved starting materials for the preparation of polyimide resins. Another object is the provision of improved impregnating solutions or varnishes for use in laminate fabrication. A most important objective is the provision of an improved method for the preparation of solid polyimide foams.

These and other objects hereinafter disclosed are met by the following invention wherein there are provided certain bis(dialkylaminoalkyl) esters of the tetracarboxylic acids, and wherein said esters, rather than the dianhydrides or the free acids, are used with the diamines in preparing the polyimides. The presently provided esters have the formula $$[\text{HO}-\overset{\text{O}}{\underset{\|}{\text{C}}}-]_2-R-[-\overset{\text{O}}{\underset{\|}{\text{C}}}-\text{O}-(\text{CH}_2)_n\overset{Y''}{\underset{|}{\text{N}}}-Y']_2$$

wherein R is a tetravalent aromatic radical of from 6 to 24 carbon atoms, is free of olefinic and acetylenic unsaturation and of substituents which react more readily with the amine radical than does a radical containing the

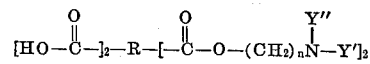

linkage, and wherein one pair of the radicals

and

is positioned at a first pair of non-tertiary nuclear carbon atoms which are immediately consecutive and wherein the other pair of the radicals

and

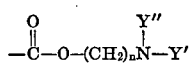

is positioned at a second pair of non-tertiary nuclear carbon atoms which are immediately consecutive, said second pair of carbon atoms being separated from said first pair of carbon atoms by at least one carbon atom; $n$ is a number of 2 to 4, and each of Y' and Y" is an alkyl radical of from 1 to 5 carbon atoms.

The invention also provides a polyimide-forming liquid composition which is heat-convertible to a solid, foamed polymer, which liquid composition is prepared by contacting together (I) the above ester, (II) a diamine of the formula $H_2N—Z—NH_2$ wherein Z is an aromatic radical having from 6 to 18 carbon atoms and being free of olefinic and acetylenic unsaturation and of substituents which react with the carboxy radical more readily than does the amine radical, and (III) an inert, volatizable, organic liquid solvent for acid ester.

The invention also provides a solid, heat-reactive, polymeric ester/amide which is produced upon drying and heating the liquid composition to a temperature of, say, about 150° C. substantially according to the scheme:

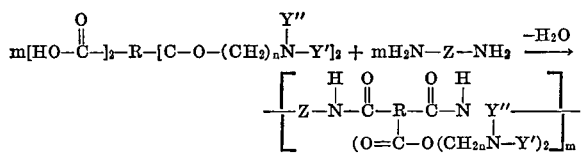

wherein R, Y', Y", Z and $n$ are as above defined and $m$ denotes the degree of polymerization.

Continued heating, say at up to about 500° C. and preferably at up to about 350° C., i.e., at a temperature of from above 150° C., but not above 350° C., results in evolution of the (dialkylamino) alkanol, with intramolecular cyclization to the polyimide:

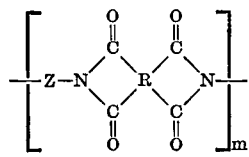

Even though heating at above the 150° C. is conducted at a substantially steady rate, fiberation of the (dialkylamino)alkanol is accompanied by foaming or expansion of the polymeric material to a porous or cellular structure. Apparently the (dialkylamino)alkyl radicals of the polymeric ester/amide are responsible for the pore-forming phenomena, since polymeric ester/amides wherein the ester group is derived from a lower alkanol do not behave in the same manner, i.e., there is very little, if any, bubble-formation during conversion to the polyimide. This is also true of the amide/acids which are derived from the free tetracarboxylic acids or the dianhydrides rather than from the diesters. I do not know whether cell-formation is due to the nature of the escaping (dialkylamino)alkanol as compared to the alkanol or water which is given off by the prior art ester/amides or acid/amides, or whether it is due to the nature of the bis[(dialkylamino)alkyl)] ester/amide as compared to the prior art materials. The cell-forming phenomena may stem from a combination of the properly volatile byproduct (dialkylamino)alkanol with the properly impervious or tenuous bis[(dialkylamino)alkyl] ester/amide. At any rate, it has been observed that even when foaming is effected in solution, for example by heating a solution of the bis[(dialkylamino)alkyl] ester/amide at the polyimide-forming or curing temperature, there is formed a hard, brittle film over the foaming mass which certainly would be expected to impede an easy escape of the evolved (dialkylamino)alkanol.

Advantageously, the bis(dialkylamino) esters which are condensed with the diamine in preparing the presently-provided polyamide/carboxylates are obtained by reacting an appropriate aromatic tetracarboxylic acid or the dianhydride thereof with an appropriate alkanolamine. Even though an excess of the latter is used, complete esterification is not obtained without using extremely stringent esterifying conditions, e.g., operating in the presence of a large quantity of a dehydrating agent. The excess alkanolamine serves as a convenient solvent for the esterification and for the polyamide-forming reaction.

The invention thus also provides a simple and convenient means of preparing new and valuable polymeric ester/amides (and subsequently polyimide) structures, which method comprises (I) contacting a tetracarboxy compound of the formula:

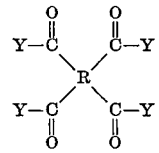

wherein each Y denotes —OH when taken singly and stand for —O— when two Y's are taken together and R is as above defined with alkanolamine of the formula

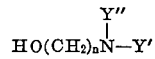

wherein Y' and Y" are alkyl of from 1 to 5 carbon atoms, to obtain a solution, in said alkanolamine of the diester

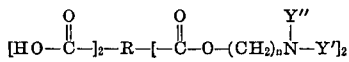

(2) contacting said solution with the diamine $$H_2N—Z—NH_2$$

wherein Z is as above defined, to obtain a heat-reactive liquid composition, and (III) drying and heating said liquid composition at up to about 150° C. to obtain a polymeric ester amide consisting essentially of the repeating unit

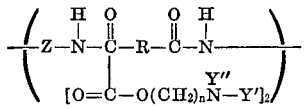

As hereinbefore disclosed, heating at higher temperatures gives a foamed polyimide. The presently provided bis[(alkylamino)alkyl] esters may also be prepared by metathesis or cross-esterification, e.g., by reaction of a lower tetraalkyl tetracarboxylate with the (dialkylamino) alkanol. When the alkyl esters of the tetracarboxylic acids are reacted with the said aminoalkanols to give the di-alkylaminoalkyl esters, alkanols are the by-products. Although the alkanols are generally poor solvents for polyamide/acids obtained by reaction of tetracarboxylic acids or their dianhydrides with diamines, they are good solvents for the present polymeric ester/amides. Accordingly, the presence of by-product alkanols is immaterial.

Examples of bis(N,N-dialkylaminoalkyl) esters which are useful include the simple and mixed esters, e.g., the bis[3-(dimethylamino)propyl], the bis[4-(diethylamino) butyl], the bis[2-(dipropylamino)ethyl], the bis[4-(dimethylamino)butyl], and the 2-(dimethylamino)ethyl 4-(diethylamino)butyl esters of the aromatic tetracarboxylic acids, generally, so long as such acids are free of non-benzenoid unsaturation and of substituents which react with an amine radical more readily than does the carboxy group and so long as the carboxy and carboxylate radicals are positioned as described above; such as 1,2,4,5-benzenetetracarboxylic acid;
1,4,5,8-naphthalenetetracarboxylic acid;
3,3',4,4'-biphenyltetracarboxylic acid;
2,2',3,3'-biphenyltetracarboxylic acid;
3,6-dimethoxy-1,2,4,5-benzenetetracarboxylic acid;

2,2′5,5′-tetramethyl-3,3′,4,4′-biphenyltetracarboxylic acid;
3,4,9,10-perylenetetracarboxylic acid;
4,4′-isopropylidenediphthalic acid;
1,8,9,10-phenanthrenetetracarboxylic acid;
4,4′-carbonyldiphthalic acid;
4,4′-[2,2,2-trifluoro-1-(trifluoromethyl)ethylidene]diphthalic acid;
4,4′-oxydiphthalic acid;
4,4′-sulfonyldiphthalic acid; etc.

Presently preferred are the bis[(dialkylamino)alkyl] esters of 4,4′-carbonyldiphthalic acid; i.e., compounds of the structure

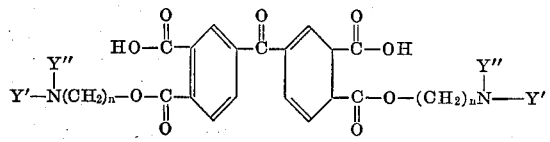

wherein each of Y′ and Y″ is alkyl of from 1 to 5 carbon atoms.

An ester of two or more different alkanolamines and the aromatic tetracarboxylic acid may be used, e.g., there may be employed mixed esters obtained by esterifying one of the four carboxylic groups with one alkanolamine and then esterifying another carboxylic group with a different alkanolamine.

The diamine with which the bis[(dialkylamino)alkyl] tetracarboxylate is reacted may be an aromatic diamine which has from 6 to 18 carbon atoms and which is free of non-benzenoid unsaturation and of substituents which react with the carboxy radical more readily than does the amine radiacl, e.g., 4,4′-oxydianiline, o-, m- or p-phenylenediamine, benzidine, 3,3′ - dimethoxybenzidine, 1,4-1,5- or 1,8-naphthalenediamine, 4,4′ - sulfonyloxydianiline, 4,4′-methylenedianiline, 4,4′-methylenebis(3-nitroaniline), 4,4′-ethylidenedianiline, 2,3,5,6 - tetramethyl-p-phenylenediamine, 4,4′ - oxybis(2,2′-propylaniline), etc.

Two or more different diamines or two or more different bis[(dialkylamino)alkyl]tetracarboxylates may be used as the respective amine and carboxylic reactants; e.g., a mixture of an amine such as benzidine and 4,4′-oxydianiline or p-phenylenediamine and 1,8-naphthalenediamine may be reacted with a single carboxylic component such as bis[2-(dibutylamino)ethyl] 1,2,4,5-benzenetetracarboxylate or bis[3-(dimethylamino)propyl] 4,4′-carbonyldiphthalate or with a mixture of bis[4 - (dipentylamino)butyl] 4,4′ - isopropylidenediphthalate and bis[2-(dimethylamino)ethyl] 3,4,9,10 - perylenetetracarboxylate or a mixture of bis[2-(dipropylamino)ethyl] 4,4′-carbonyldiphthalate and bis[3-(dimethylamino)butyl] 4,4′ - carbonyldiphthalate. Thereby there are obtained polymers having different linkages dispersed more or less randomly in the polymer molecule. Such an expedient is useful in tailoring polymer structures having properties intermediate to those attributable to the individual linkages.

Because condensation of the bis[(dimethylamino)alkyl] ester of the tetracarboxylic acid with the diamine occurs by reaction of the two free acid groups of the ester with the two amino groups of the diamine to form the polyamide/carboxylate, the ester and the amine are advantageously employed in such stoichiometric proportions, i.e., one mole of the ester per mole of the amine. However, a slight excess of either component may be used. The presently provided heat-reactive liquid compositions are prepared by simply contacting the diester with the diamine in an inert, organic liquid medium which is a solvent for the ester. However, for facilitating subsequent processing, it is preferred to employ a medium in which solution of both the ester and the diamine can be attained. If an excess of the (dialkylamino)alkanol has been employed in esterifying the tetracarboxylic acid or dianhydride, the excess can conveniently serve as the solvent. Also, if desired, to any excess of the said alkanolamine present in the esterification product there may be added one or more other solvents, e.g., a lower alcohol or ether such as butanol or propyl ether. When production of the bis[(dialkylamino)alkyl]ester has been conducted by transesterification, e.g., by reaction of the said alkanolamine with another diester of the tetracarboxylic acid, there is obtained as by-product a hydroxy compound corresponding to the alcoholic moiety of the starting ester, e.g., a lower alkanol when the starting ester is a dialkyl tetracarboxylate. The by-product hydroxy compound need not be removed from the crude esterification product previous to formulation of the fluid composition. For example, a dialkyl ester such as dibutyl 4,4′-carbonyldiphthalate is reacted with 3-(dimethylamino) propanol to give bis[3-(dimethylamino)propyl] 4,4′ - carbonyldiphthalate together with butanol as by product. Without removing the butanol, the reaction mixture is contacted with a diamine for obtaining the fluid composition. The butanol serves as solvent for both the bis[3-dimethylamino)propyl] ester and for the carboxylate-containing polymer. If dilution of either the polymer-forming reaction mixture or of the polymer-containing product is desired, there may be employed either the 3-(dimethylamino) propanol or butanol or any other lower (dialkylamino) alkanol or alcohol. In the transesterification reaction as well as in esterification of the free tetracarboxylic acid or dianhydride thereof, an excess of the dialkylamino alkanol is conveniently used to provide for proper esterification, for serving as solvent in the polymer-forming reaction, and in subsequent heating of the polymer for conversion to the foamed polyimide.

Depending upon the quantity of solvent used, the reaction mixture comprising the diester and the solvent which advantageously is the same as that used for preparing the bis[(dialkylamino)alkyl]ester may be used directly for the preparation of polymeric ester/amide. However, if the esterification reaction mixture is too fluid for the intended application, the solvent may be removed partially or even entirely by volatilization at ordinary pressure or by evacuation. The fluid concentrate obtained by removing part of the solvent may be used.

Curing of the heat-reactive liquid mixture or of the polymeric ester/amide for conversion to the foamed polyimide is conducted by heating either in air or in an inert atmosphere which may be, e.g., nitrogen, argon, or vacuum. Temperatures of from, say, 150° C. to 350° C. are preferred. The curing temperature will depend upon such conditions, at time, pressure and atmosphere, as well as upon the nature of the individual (dialkylamino) alkyl substituent. Generally, a lower temperature will require longer curing time. In experimental runs, the extent of curing can be readily ascertained by noting substantial cessation in weight change owing to volatilization of solvent, if any, and of the by-product (dialkylamino)alkanol resulting from the ring-closing imide-forming reaction between the carboxylate moiety and the unreacted amino radical of the carboxylate-containing polymer. The well-cured foamed structure will be strong and resilient.

For the preparation of laminates, the heat-reactive liquid composition is used to coat and/or impregnate plies of substantially any desired material of construction, and the thus-treated plies are dried and subjected to heat, with or without concomitant use of pressure. When pressure is employed, it generally need be only of a low order, e.g., pressures of from, say, about 10 to 200 p.s.i. may be used. Plies of glass, metal, plastics and ceramics are thus bonded toegther through the intervening layer of adherent polyimide foam. Other composites may be similarly prepared, employing filaments or textiles of glass, metal, silica, graphite, etc. Finely comminuted reinforcing materials or fillers, which may be in microballoon form, may be incorporated with the polymeric ester/amide and solvent to form a mobile mass which can be formed while expanding and curing.

In coating applications the heat-reactive liquid composition or a solution of polymeric ester/amide is deposited upon the substrate, the solvent is evaporated and the substrate with its deposit of dried coating, is heated at the polyimide-forming temperature (150° C. to 350° C. or even up to 500° C.) to give an adherent foamed coating.

The presently provided polymeric ester/amides possess utility per se in coating applications, i.e., they need not be converted to the polyimides, because solutions thereof are useful as protective finishes when exposure to polyimide-forming temperatures is not contemplated. However, since the carboxylate-free, cured products, i.e., the polyimides are foamed structures which may be heated to about 350° C. in air and higher in an inert atmosphere without substantial weight loss and because the tough cellular polyimides resist attack by liquids which dissolve or soften the polymeric ester/amides from which they are obtained, conversion to the polyimide foams comprises the major usefulness of said ester/amides.

Whether or not the contemplated utility involves the polymeric ester/amide or the polyimide as the end product, a very convenient method of operation involves preparing a bis[(dialkylamino)alkyl]ester of the aromatic tetracarboxylic acid by reacting the acid, or preferably its dianhydride, with an appropriate alkanolamine, using an excess of the alkanolamine as a solvent, to obtain a solution of said ester in the alkanolamine, mixing the solution with the appropriate diamine, and using the resulting heat-reactive liquid composition for application to a substrate, as an impregnating agent in the manufacture of porous laminates or other composites, or for casting into porous, shaped articles. Conversion to the polymeric ester/amide is effected in situ. For example, for preparation of formed, cellular articles, the liquid composition is simply poured into a mold and heated. Depending upon the density and cell-size desired, heating may be done gradually or abruptly. Thus, the mold with its liquid contents may be placed into an oven which has been preheated to the polyimide-forming temperature, say 300° C. and maintained at that temperature until expansion has ceased. Or the mold with its contents may be heated gradually, first at a temperature sufficient only to volatilize off the solvent, then at an intermediate temperature (below about 150° C.) to form the amide/ester prepolymer, and finally at about 150° C. to up to about 500° C., and preferably at up to about 350° C. to form the polyimide.

For the preparation of a composite, plies of an inorganic textile, say, of glass cloth or of a textile of silica or carbon fiber are impregnated with the heat-reactive liquid composition and heated under pressure. Depending upon the extent of heating, the matrix of the resulting composite will consist essentially of either the polyamide/carboxylate or the polyimide to which it cyclizes upon continued heating at higher temperatures. Advantageously said liquid composition is applied to the substrate and polymerization to the polyamide/carboxylate is conducted by heating the substrate with its deposit to about 150° C. before stacking to a laminate structure. The stack is then compression molded at a temperature of above 150° C. and below about 500° C. at a pressure of, say, from about 10 p.s.i. to 1,000 p.s.i. to obtain a laminate containing foamed polyimide as the matrix.

The invention thus provides strong, foamed structures which may be shaped, cast objects, laminates, coatings or filaments. The presently-provided foamed polyimides are flameproof and highly resistant to heat; they are thus particularly valuable as insulating materials and for this purpose they may be provided in sheet or shredded form. Coatings of the foamed polyimides are useful for numerous protective purposes, e.g., as ablation and heat shields and as housing or enclosures for heat-producing equipment. The low-density, toughness and heat-stability of the foamed structures recommend them for use in any application where a combination of these properties is desired. They may be modified in conventional manner, e.g., by incorporation of an electricity-conducting material such as pulverulent carbon black or finely comminuted graphite when an electricity-conducting material is desired; by the incorporation of other fillers, dyes, pigments, etc., for specialty purposes; by using metal fibers, textiles or screens instead of glass fiber cloth as the reinforcing agent in the preparation of porous laminates, etc.

The invention is further illustrated by, but not limited to, the following examples.

EXAMPLE 1

To 584.2 g. (6.6 mole) of 2-(dimethylamino)ethanol there was stirred in 322.2 g. (1.0 mole) of 4,4'-carbonyldiphthalic anhydride. An exothermic reaction, with the temperature rising to 65° C., was observed. After cessation of temperature rise, the mixture was heated to 100° C. in order to assure complete reaction. It was then allowed to cool to 40° C. To the resulting solution of the bis[2 - (dimethylamino) - ethyl]ester of 4,4'-carbonyldiphthalic acid in 2-(dimethylamino)ethanol there was gradually added 101.8 g. (1 mole) of m-phenylenediamine, and the whole was stirred for about 2 hours, at the end of which time all solids had dissolved. The resulting solution, having a solids content of 60%, will be hereinafter referred to as a heat-reactive liquid composition or varnish.

A portion of said liquid composition was poured into an aluminum cup, and the cup with its contents was placed in an oven which had been preheated to 315° C. and maintained in the oven at this temperature for 2 hours. At the end of that time the contents of the cup had been converted into a low-density, foamed, shaped structure of very good flexibility and toughness. The porous article thus obtained was fire-resistant; it could not be ignited by a match flame.

EXAMPLE 2

A solution of 161.1 g. (0.5 mole) of 4,4'-carbonyldiphthalic anhydride in 253 g. of 2-(dimethylamino)ethanol was heated to 115° C. and held at this temperature for 30 minutes. The resulting reaction mixture, comprising a mixture of the bis[2-(dimethylaminoethyl)] ester of 4,4'-carbonyldiphthalic acid dissolved in 2-(dimethylamino) ethanol, was allowed to cool to about 40° C. It was then mixed with 54 g. (0.5 mole) of m-phenylenediamine, and the whole was stirred for about 30 minutes without application of heat. The resulting mixture, having a solids content of 65%, will be hereinafter referred to as a heat-reactive liquid composition.

A 54.5 g. portion of said composition was heated in a 4" square aluminum mold, first for 1.25 hour at 70° C. under water aspirator vacuum and then for 50 minutes at 175° C. in a forced draft oven. By the end of this time said liquid composition had started to foam, so the mold and its contents were transferred to a 315° C. forced draft oven and maintained in the oven at this temperature for 35 minutes. At the end of this time, the liquid had been entirely converted into a tough, resilient, cellular structure. In order to assure complete curing, heating at the 315° C. temperature was continued for an hour. The cellular structure was then allowed to cool and four 2" x 2" x 1" test specimens were cut therefrom for measurement of density and compression strength. The specimens were found to have an average density of 0.656 lbs./ft.$^3$, and a piece which had been cut perpendicular to the foam was found to vary only very slightly from one which had been cut parallel to the foam, i.e., 0.643 lbs./ft.$^3$ versus 0.668 lbs./ft.$^3$. The average compression strength of the test specimens, determined by compressing to 75% of the thickness in the 1" direction, was found to be 5.3 p.s.i.

EXAMPLE 3

In Example 2, heating at 70° C. was conducted in order to volatilize the solvent before reaction to give the polymeric ester/amide. In order to ascertain the effect of this treatment on the nature of the final, porous, molded product, two 50 g. samples of the liquid composition or varnish of Example 2 were respectively placed in beakers which had been lined with silicone grease. One of the samples, hereinafter referred to as (A), was heated at 70° C. for 23 minutes. A weight loss of 3.9 g. resulted. The other sample, hereinafter referred to as (B), was not. Then the beakers of (A) and (B) were oven-heated for 1 hour at 175° C., allowed to cool and weighed. The cumulative weight loss in (A) was 22.2 g., whereas the weight loss in (B) was 23.8 g. Both beakers were then over-heated at 315° C. for 1 hour. After this treatment, the cumulative weight loss in (A) was 28.4 g. whereas that in (B) was 28.3 g. Both samples were tough, porous products of very good resiliency.

This experiment shows that the quantity of solvent present before heating to the polymerization temperature has substantially no effect on the weight of the final polyimide, i.e., in both instances the excess (dialkylamino) alkanol which is present as solvent and the (dialkylamino)alkanol which is evolved as by-product are removed to the same extent. However, initial removal of solvent by the 70° C. heating has an effect on the rate of subsequent liberation of the dialkylamino)alkanol. Note that the weight loss for the sample (A) as a result of the 175° C. heating is only 22.2 g. —3.9 g. or 18.3 g. whereas it is 23.8 g. for sample (B). However, the more rapid loss in (B) during the 175° C. heating period is responsible for a difference in cell size, the product obtained from (A) being more finely pored than that obtained from (B).

EXAMPLE 4

In this example, a liquid composition or varnish was prepared as in Example 2, and it was incorporated with a surfactant before using it for polyimide formation. In one run, 25 g. of the varnish was mixed with 0.25 g. of a commercial surfactant (the N,N-dimethylamide of a higher fatty acid). In another run, 25 g. of the varnish was mixed with 0.25 g. of N,N-dimethyloctadecylamine as surfactant. Both mixtures were warmed on the water bath to solution and poured respectively into glass molds, and oven-heated at 175° for 30 min. The oven temperature was then raised to 250° C. and the said molds were maintained in the oven for about an additional hour. At the end of that time, the contents of each of the molds had foamed. After cooling to room temperature, both of the hard, shaped articles were removed from the molds and inspected. Although the article which had been obtained from the mixture which contained the amine surfactant had a slightly lower density than that which had been obtained from the amide surfactant, both were hard, tough and porous.

Although, for purposes of comparison, the above examples are limited to the 2-(dimethylamino)ethyl ester of 4,4'-carbonyldiphthalic acid as the ester component and m-phenylenediamine as the organic amine component of the polyimide-forming liquid compositions, other (dialkylamino)alkyl esters and other diamines are likewise useful; thus, instead of the bis[2-(dimethylamino) ethyl] ester there may be prepared and employed the bis[3-(dimethylamino)propyl] or the bis[4-(diethylamino(butyl)] ester of 4,4'-carbonyldiphthalic acid or 1,2,4,5-benzenetetracarboxylic acid or of other tetracarboxylic acids, e.g., 4,4'-isopropylidenediphthalic acid or 2,3,6,7-naphthalenetetracarboxylic acid and instead of the m-phenylenediamine there may be used benzidine or 1,8-napthalenediamine or 4,4'-oxydianiline or 4,4'-sulfonyldianiline. The solvent may or may not be (dialkylamino) alkanol from which the bis[(dialkylamino)alkyl] ester is derived. For example, instead of employing an excess of 2-(dimethylamino) ethanol is preparing the bis[2-(dimethylamino)ethyl] ester of 4,4'-carbonyldiphthalic acid as in the above examples, the ester may be prepared by employing in the reaction mixture only the stoichiometrically required quantity of the (dialkylamino)alkanol in the presence or absence of an inert, organic liquid diluent. Subsequently, for the polyamide- and polyimide-forming reactions, when an excess of the (dialkylamino) alkanol has not been used in forming the ester, there may be used such diluents as the lower alcohols.

Obviously, many modifications and variations of the invention may be made without departing from the spirit and scope thereof, and therefore only such limitations should be imposed as are indicated in the appended claims.

What is claimed is:

1. The method of preparing a foamed polyimide which comprises heating, at a temperature of from above about 150° C. to about 500° C., a heat-reactive, polyimide-forming liquid composition consisting essentially of (1) an ester of the formula

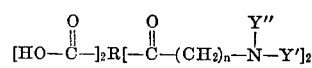

wherein R is a tetravalent aromatic radical of from 6 to 24 carbon atoms, is free of olefinic and acetylenic unsaturation and of substituents which react more readily with the amine radical than does a radical containing the

linkage, and wherein one pair of the radicals

and

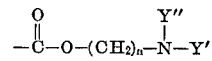

is positioned at a first pair of non-tertiary nuclear carbon atoms wich are immediately consecutive and wherein the other pair of the radicals

and

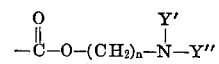

is positioned at a second pair of non-tertiary nuclear carbon atoms which are immediately consecutive, said second pair of carbon atoms being separated from the first pair of carbon atoms by at least one carbon atom; n is a number of 2 to 4 and each of Y'' and Y' is an alkyl radical of from 1 to 5 carbon atoms, (II) a diamine of the formula H₂N—Z—NH₂ wherein Z is an aromatic radical having from 6 to 18 carbon atoms and being free of olefinic and acetylenic unsaturation and of substituents which react with the carboxy radical more readily than does the amine radical, and (III) an inert, organic liquid solvent for said ester.

2. The method defined in claim 1, further limited in that R is

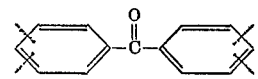

3. The method defined in claim 1, further limited in that Z is phenylene.
4. The method defined in claim 1, further limited in that $n$ is 2.
5. The method defined in claim 1, further limited in that each of Y″ and Y′ is methyl.
6. The method defined in claim 1, further limited in that R is

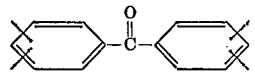

Z is phenylene, $n$ is 2, and each of Y″ and Y′ is methyl.

References Cited
UNITED STATES PATENTS 3,326,851  6/1967  Tocker.
3,483,144  12/1969  Lavin et al.

MURRAY TILLMAN, Primary Examiner
W. J. BRIGGS, SR., Assistant Examiner

U.S. Cl. X.R.
117—161; 161—197, 214, 227; 260—78